(12) United States Patent
Benmimoun et al.

(10) Patent No.: US 11,628,829 B2
(45) Date of Patent: Apr. 18, 2023

(54) OPERATING A MOTOR VEHICLE

(71) Applicant: Ford Global Technologies, LLC, Dearborn, MI (US)

(72) Inventors: Mohamed Benmimoun, Aachen (DE); Sufian Ashraf Mazhari, Aachen (DE); Ahmed Benmimoun, Aachen (DE); Muhammad Adeel Awan, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 261 days.

(21) Appl. No.: 16/829,228

(22) Filed: Mar. 25, 2020

(65) Prior Publication Data
US 2020/0346638 A1  Nov. 5, 2020

(30) Foreign Application Priority Data
Apr. 30, 2019  (DE) .......................... 102019206210.5

(51) Int. Cl.
| | | |
|---|---|---|
| *B60W 30/06* | (2006.01) | |
| *G05D 1/02* | (2020.01) | |
| *G05D 1/00* | (2006.01) | |
| *B60W 60/00* | (2020.01) | |

(52) U.S. Cl.
CPC ........ *B60W 30/06* (2013.01); *B60W 60/0051* (2020.02); *G05D 1/0011* (2013.01); *G05D 1/0212* (2013.01)

(58) Field of Classification Search
CPC ............. B60W 30/06; B60W 60/0051; G05D 1/0011; G05D 1/0212; B62D 15/0285
See application file for complete search history.

(56) References Cited

U.S. PATENT DOCUMENTS

| | | | | |
|---|---|---|---|---|
| 2017/0015312 | A1* | 1/2017 | Latotzki | ............ B62D 15/0285 |
| 2017/0329346 | A1* | 11/2017 | Latotzki | ................. G08G 1/164 |
| 2018/0194344 | A1* | 7/2018 | Wang | ................... G05D 1/0236 |
| 2018/0204464 | A1 | 7/2018 | Lavoie et al. | |
| 2018/0297589 | A1* | 10/2018 | Hasejima | ............. B62D 15/028 |
| 2018/0336007 | A1* | 11/2018 | Li | ............................ G10L 15/22 |
| 2020/0081446 | A1* | 3/2020 | Ishinoda | ................. B60R 99/00 |

OTHER PUBLICATIONS

"Self-parking cars help relieve driver stress," Spotlight, WRAL. com, May 25, 2017, 5 pages.
Siedentop, C., et al., "Path-Planning for Autonomous Parking with Dubins Curves," Daimler AG, Autonomous Driving, Böblingen, Germany, published 2015, 8 pages.
Chen C., et al., "Path Planning with Orientation-Aware Space Exploration Guided Heuristic Search for Autonomous Parking and Maneuvering," Fortiss GmbH, An-Institut Technische Universitat München, Munich, Germany, published 2015, 6 pages.

* cited by examiner

*Primary Examiner* — Jeff A Burke
*Assistant Examiner* — Sihar A Karwan
(74) *Attorney, Agent, or Firm* — Frank A. MacKenzie; Bejin Bieneman PLC

(57) ABSTRACT

While a vehicle is operated from a first area to a second area based on a stored route, one or more turning regions are identified along the stored route based on sensor data. Upon selecting one turning region, a route is determined from the second area to the first area via the selected turning region based on the stored route. Upon receiving a message from a handheld device, the vehicle is actuated to operate along the route and turn around in the selected turning region.

15 Claims, 5 Drawing Sheets

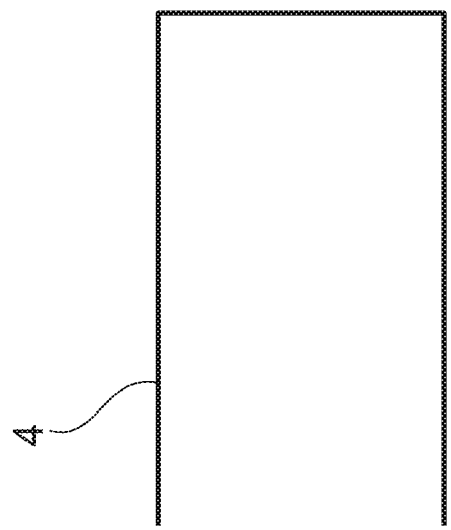
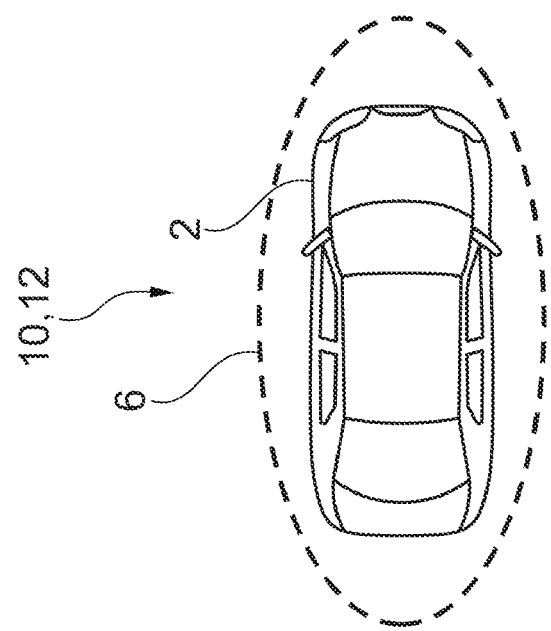
Fig. 1

OPERATING A MOTOR VEHICLE

CROSS-REFERENCE TO RELATED APPLICATIONS

This patent application claims priority to German Application No. 102019206210.5, filed Apr. 30, 2019, which is hereby incorporated herein by its reference in its entirety.

BACKGROUND

Self-parking functions, such as for example home zone parking or valet parking, render it possible for a motor vehicle to automatically park in and exit a parking space. In this case, a driver may exit the motor vehicle in a handover zone, and the motor vehicle then automatically steers toward a predetermined parking space. For this purpose, previously a driving route was recorded while the driver of the motor vehicle steers the motor vehicle from the handover zone to the predetermined parking space. A self-parking function of this type is disclosed in US 2017/329346 A1.

When the motor vehicle exits the parking space, said motor vehicle then drives the recorded driving route in the reverse direction. However, it is possible for this to lead to an undesired orientation of the motor vehicle in the handover zone. For example, if the motor vehicle enters a garage in a forward direction and then exits in a rearward direction, the motor vehicle is oriented incorrectly in the handover zone.

SUMMARY

The present disclosure relates to operating a motor vehicle having a self-parking function.

A method for operating a motor vehicle having a self-parking function, said method including:
  reading a parking data set that is representative of a parking maneuver,
  reading a turning region data set that is representative of a turning region, and
  determining a data set for exiting the parking space that is representative of a maneuver for exiting the parking space using a turning maneuver by evaluating the parking data set and the turning region data set.

In other words, the disclosed method evaluates a turning region data set beforehand or while performing a maneuver for exiting a parking space in order to determine a suitable region for a turning maneuver of the motor vehicle. In this case, both a parking data set as well as the turning region data set respectively comprise one or a plurality of data sets that is representative of a parking maneuver or a turning region. It is thus possible by means of adding a turning maneuver to the data set for exiting the parking space, which is based on the parking data set, to change and therefore to adapt the orientation of the motor vehicle.

In one example, the turning region data set is determined by means of evaluating data regarding the surrounding area, wherein the data regarding the surrounding area is provided by surroundings sensors of the motor vehicle. Surroundings sensors may be for example LiDAR sensors, RADAR sensors or ultrasonic sensors or camera systems. The data regarding the surrounding area may be obtained during a parking maneuver or by means of scanning an area surrounding the motor vehicle. Consequently, information regarding suitable turning possibilities is provided, in particular along a route that is driven along during a parking maneuver or maneuver for exiting a parking space.

Additionally, or alternatively, the turning region data set is determined by means of evaluating a user input. The user input may by a driver of the motor vehicle with the aid of a handheld device, wherein the driving route of the parking maneuver or the maneuver for exiting the parking space and also parts of the surrounding area that is ascertained are displayed on the screen of the handheld device. The term "a handheld device" is to be understood to be a portable electronic device, such as for example a smartphone, which is supplied with current via a rechargeable battery or batteries and may be used for different applications. The handheld device is so small and light that it may be held in only one hand during operation;

The user input therefore may be marking a turning region on the screen of the smartphone.

Moreover, the present disclosure includes a computer program product, a control device and a motor vehicle having a control device of this type.

SUMMARY OF THE DRAWINGS

The present disclosure is explained with the aid of drawings. In the drawings:

FIG. 1 illustrates a schematic view of a parking procedure.

DESCRIPTION

Figure 2:
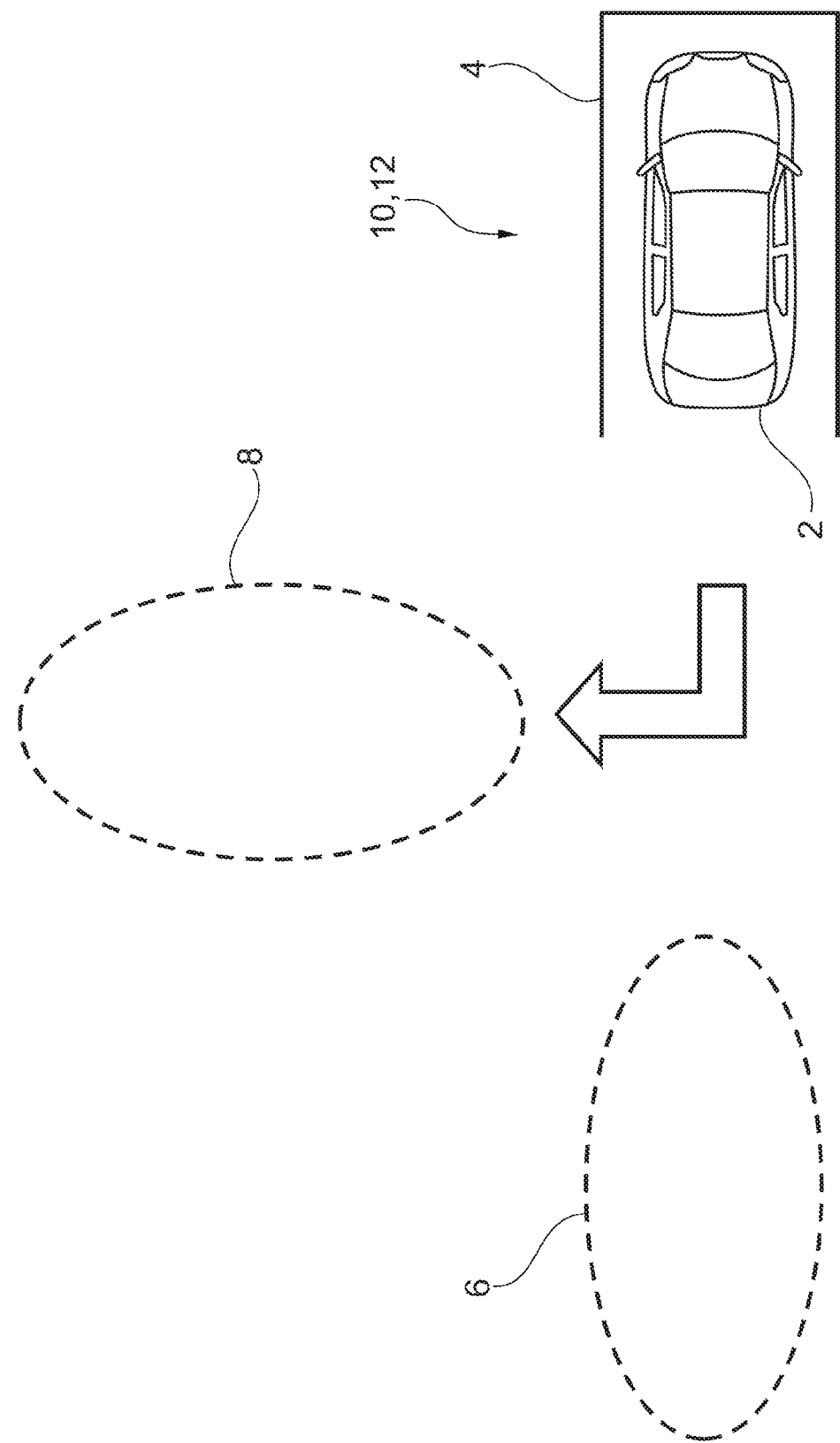
FIG. 2 illustrates a schematic view of a first step of a procedure for exiting a parking space.

Reference is initially made to FIG. 1.

A scenario is illustrated in which a motor vehicle 2 performs a parking maneuver in a parking space 4, such as for example a garage.

The motor vehicle 2, in the present exemplary embodiment a car, in this case comprises a self-parking function.

The self-parking function renders it possible for the driver of the motor vehicle 2 to exit the motor vehicle 2 in a handover zone 6 and the motor vehicle 2 then automatically or autonomously steers to the parking space 4 in order to park in said parking space 4. For this purpose, during a preceding training phase the route from the handover zone 6 to the parking space 4 is driven by the driver of the motor vehicle 2 using the motor vehicle 2 and a parking data set ED that is representative of this parking maneuver is recorded by a control device 12 of the motor vehicle 2. For this purpose, and for the tasks and functions described below, the control device 12 may comprise hardware and/or software components.

If after terminating the training phase the driver reaches the handover zone 6 and exits the motor vehicle 2, the driver may initiate an automatic parking maneuver based upon the parking data set ED.

In this case, using surroundings sensors 10 such as for example LiDAR, RADAR or ultrasonic sensors or camera systems the motor vehicle 2 detects its surroundings and applicable obstacles along the driving route in accordance with the parking data set ED and evades these objects.

Moreover, the motor vehicle 2 may also perform a maneuver for exiting the parking space 4. For this purpose, the control device 12 produces a data set for exiting the parking space AD based upon the parking data set ED. The data set for exiting the parking space AD comprises the driving maneuver of the parking data set ED in the inverse or reversed sequence, such as for example a film played backward.

The motor vehicle 2 then returns to the handover zone 6 where the driver may get into the motor vehicle 2 and assume control. However, the motor vehicle 2 is then provided with the same orientation in the handover zone 6 as said motor vehicle 2 was stopped in during the parking procedure. However, it would be desirable that the motor vehicle 2 comprises an orientation rotated about 180°, such that it would be immediately possible to drive onto a road in the forward direction and not, as is illustrated in FIG. 1, in the rearward direction.

Figure 3:
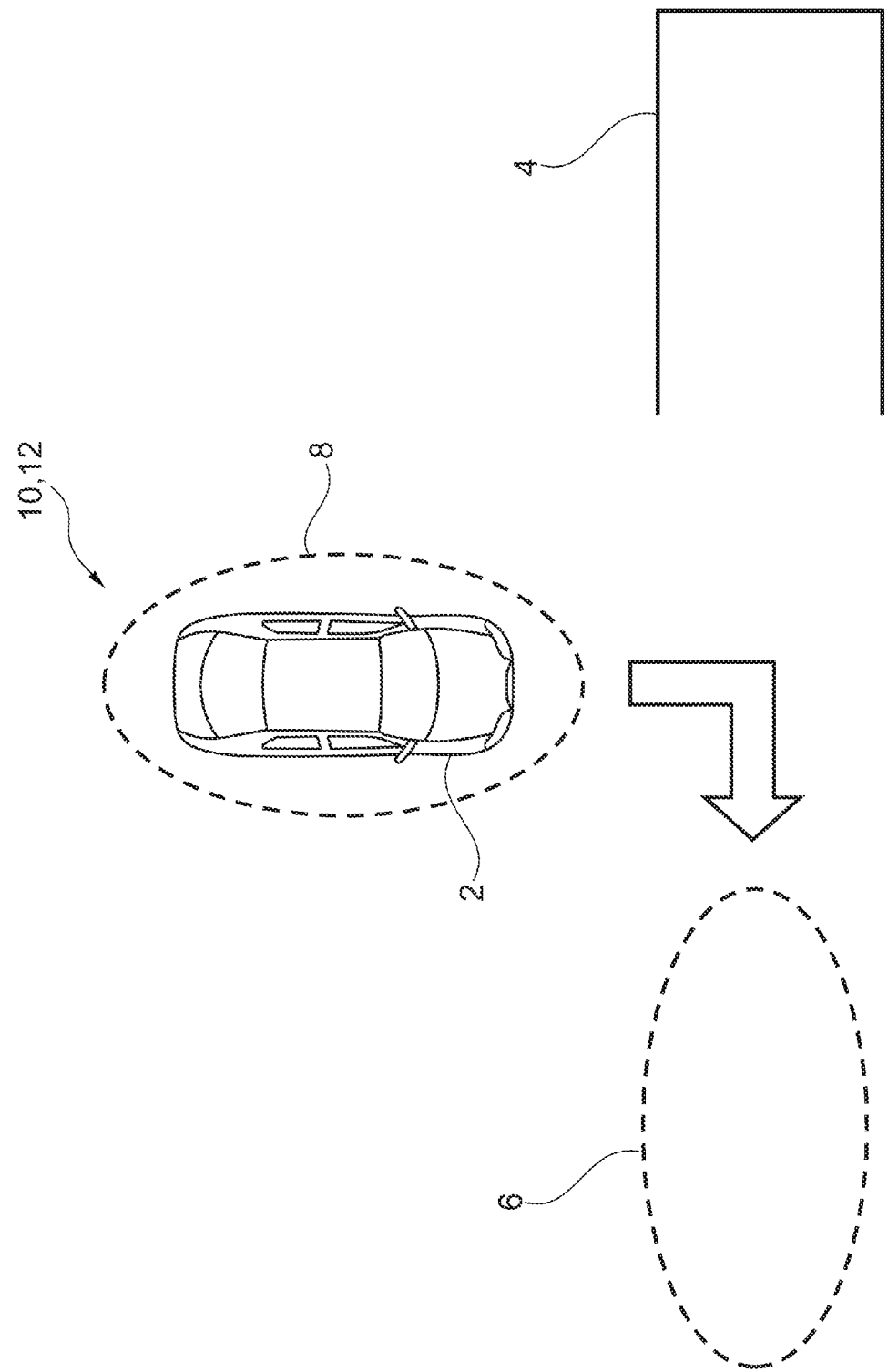
FIG. 3 illustrates a schematic view of a second step of the procedure for exiting the parking space.
Figure 4:
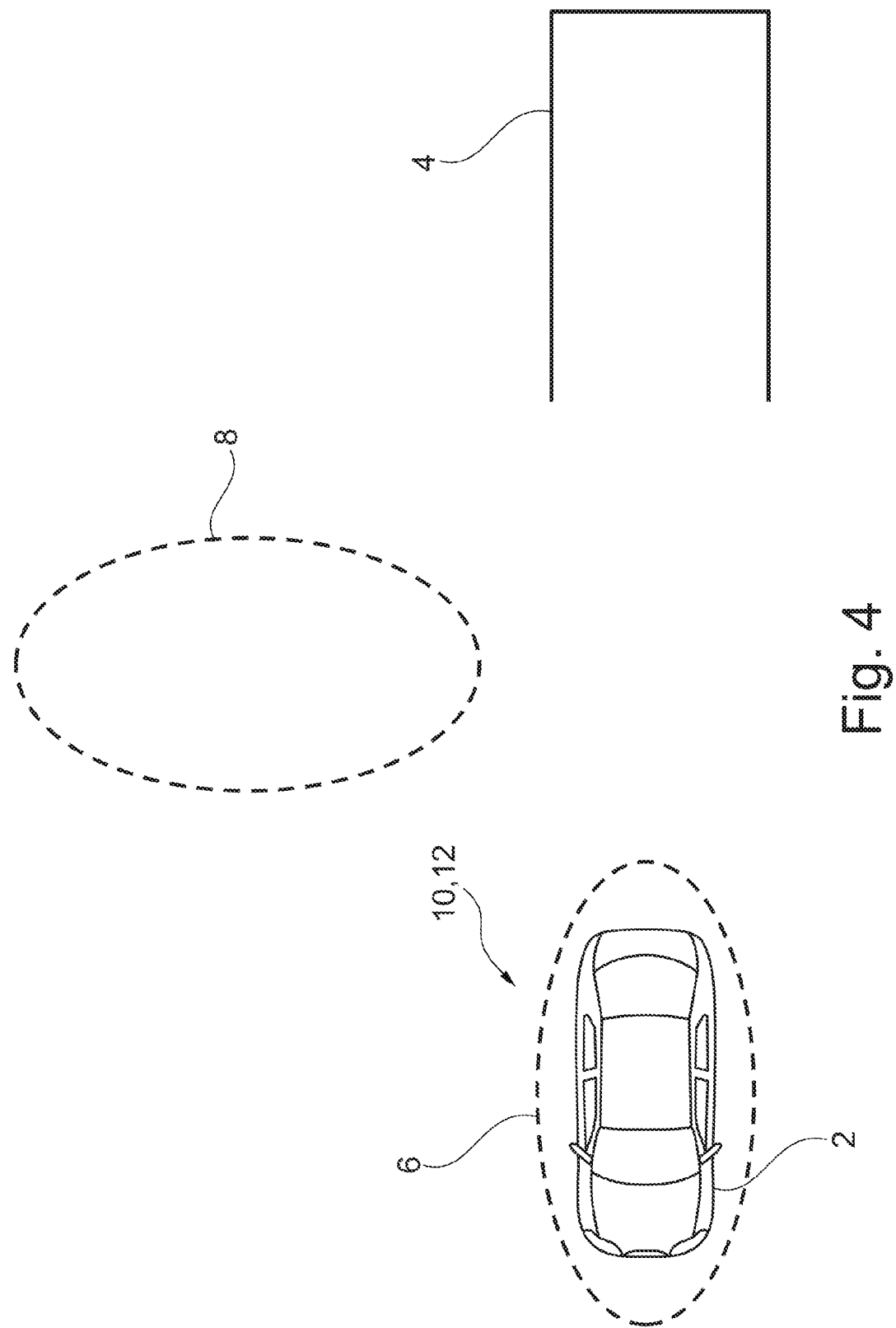
FIG. 4 illustrates a schematic view of a third step of the procedure for exiting the parking space.

In addition, reference is made to FIGS. 2 to 4.

In order to change the orientation of the motor vehicle 2 during the maneuver for exiting the parking space 4, in other words to rotate the motor vehicle 2 about 180°, the control device 12 is embodied for the purpose of reading a turning region data set WD that is representative of a turning region 8. The turning region data set WD designates a region that is suitable for a turning maneuver in order to rotate the motor vehicle 2 about 180°.

The control device 12 then determines a corresponding data set for exiting the parking space AD by means of evaluating the parking data set ED and the turning region data set WD.

The data set for exiting the parking space AD comprises an additional turning maneuver. In the present exemplary embodiment, the motor vehicle 2 steers in accordance with the data set for exiting the parking space AD initially driving in reverse to the turning region 8 (see FIG. 2). If the motor vehicle 2 has reached the turning region 8 (see FIG. 3), the motor vehicle 2 changes the direction of travel and drives in the forward direction starting from the turning region 8 to the handover region 6 (see FIG. 4). Consequently, the motor vehicle 2 is now ready for the handover in the handover region 6 rotated about 180° and it is possible to drive onto a road in the forward direction.

Figure 5:
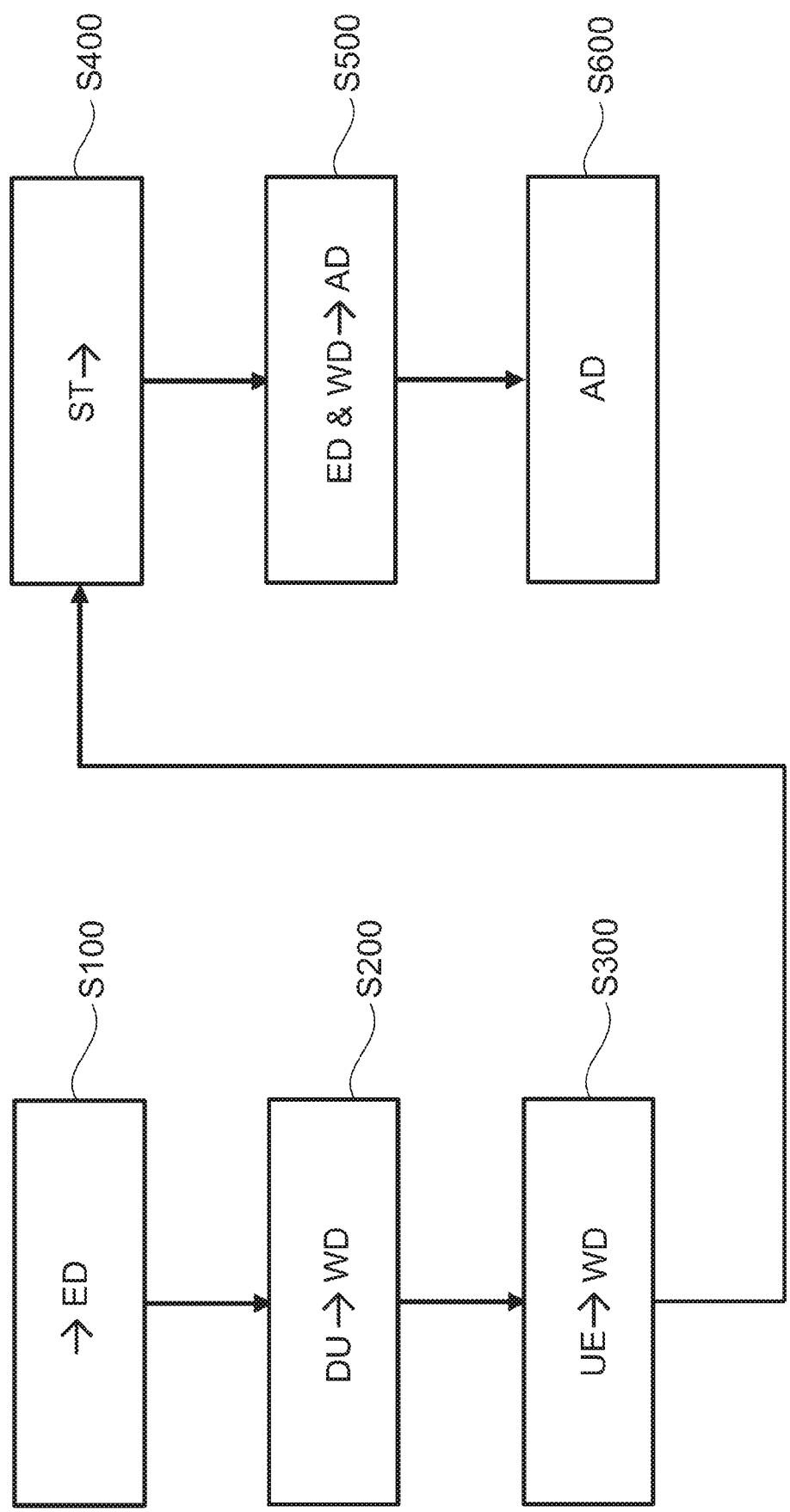
FIG. 5 illustrates a schematic view of a method sequence for operating a motor vehicle having a self-parking function.

A method for operating the motor vehicle 2 having the self-parking function is explained with additional reference to FIG. 5.

In a first step S100, during the preceding training phase the route is driven by the driver of the motor vehicle 2 using this motor vehicle 2 and the parking data set ED that is representative of this parking maneuver is recorded by the control device 12 of the motor vehicle 2.

At the same time, in a further step S200 data regarding the surrounding area UD is read by the control device 12, said data regarding the surrounding area UD originating from surroundings sensors 10, such as for example LiDAR, RADAR or Ultrasonic sensors or camera systems. The data regarding the surrounding area UD is evaluated in order to produce the turning region data set WD that is representative of a turning space.

In addition or alternatively, it may be provided that the turning region data set WD is determined by means of evaluating a user input UE. The user input UE may be provided in a further step S300 by a driver of the motor vehicle 2 with the aid of a handheld device, such as for example a smartphone, wherein the driving route of the parking maneuver or the maneuver for exiting the parking space 4 and also parts of the surrounding area that is detected are displayed on the screen of the handheld device. The user input UE, therefore, may be marking a turning region 8 on the screen of the handheld device.

If, after terminating the training phase, the driver exits the motor vehicle 2 after reaching the handover zone 6 in a further step S400, the driver starts the parking maneuver by means of transmitting a starting signal ST, for example with the aid of a handheld device such as a smartphone, said parking maneuver then being performed in accordance with the parking data set ED.

If the driver of the motor vehicle 2 would then like to exit the parking space 4 and take over in the handover zone 6, in a further step S500, the driver starts the maneuver for exiting the parking space 4 using their handheld device. For this purpose, the control device 12 determines the data set for exiting the parking space AD from the evaluation of the parking data set ED and the turning region data set WD.

If the data set for exiting the parking space AD comprises a plurality of possible driving routes and also the turning region data set WD comprises a plurality of possible turning regions 8, the control device 12, for example, selects the combination with the shortest distance. If it is detected using the surroundings sensors 10 that the selected turning region 8 is blocked, for example, owing to motor vehicles that are parked in the selected turning region 8, the control device 12 selects the nearest turning region 8. In a similar manner, the control device 12 may also select an alternative driving route, for example, if it has been detected using the surroundings sensors 10 that the selected driving route is blocked, for example, owing to parked motor vehicles.

Moreover, it is possible to fall back to the functions of a parking steering assistant so as to determine a suitable turning region 8, said parking steering assistant being embodied for the purpose of measuring parking gaps and for parking in and exiting a parking space 4 using the motor vehicle 2 by means of steering movements.

In a further step S600, the control device 12 then steers the motor vehicle 2 in accordance with the data set for exiting the parking space AD initially, for example, driving in reverse into the turning region 8, then, for example, changing the driving direction of the motor vehicle 2 and driving forward starting from the turning region 8 to the handover region 6.

Consequently, the motor vehicle 2 is now ready in the handover region 6 rotated about 180° with respect to the handover and it is possible to drive onto a road in the forward direction.

In a variation from the present exemplary embodiment, it is possible for the sequence of the steps to also be different. Moreover, multiple steps may be performed at the same time or simultaneously. Furthermore, it is also possible to leave out individual steps.

It is thus possible by means of adding a turning maneuver to the data set for exiting the parking space AD, which is based on the parking data set ED, to change and therefore to adapt the orientation of the motor vehicle 2.

LIST OF REFERENCE NUMERALS

2 Motor vehicle
4 Parking space
6 Handover zone
8 Turning region
10 Surroundings sensors
12 Controller
AD Data set for exiting the parking space
ED Parking data set
ST Starting signal
UD Data regarding the surrounding area
UE User input WD Turning region data set
S100 Step
S200 Step
S300 Step
S400 Step
S500 Step
S600 Step

The invention claimed is:

1. A method, comprising:
   while operating a vehicle from a first area to a second area based on a stored route, identifying a plurality of turning regions along the stored route based on sensor data and receiving, via a handheld device, a user input specifying at least one of the turning regions;
   then determining a plurality of routes based on the stored route and the plurality of turning regions, each route extending from the second area to the first area via one of the turning regions; and
   then, upon selecting one turning region, actuating the vehicle, in response to receiving a message from the handheld device, to operate along the route including the selected turning region and turn the vehicle around in the selected turning region.

2. The method of claim 1, further comprising actuating the vehicle to change a direction of travel between a reverse direction and a forward direction in the selected turning region.

3. The method of claim 1, further comprising selecting the turning region based on a distance of the route including the turning region being less than respective distances of the other routes including the other turning regions.

4. The method of claim 1, further comprising selecting the turning region based on a distance between the second area and the turning region.

5. The method of claim 4, further comprising selecting the turning region additionally based on a size of the turning region and a size of the vehicle.

6. The method of claim 5, further comprising selecting the turning region additionally based on a turning radius of the vehicle.

7. The method of claim 1, further comprising selecting the turning region based on receiving, via the handheld device, the user input specifying the turning region.

8. A control device, configured to:
   while operating a vehicle from a first area to a second area based on a stored route, identify a plurality of turning regions along the stored route based on sensor data and receiving, via a handheld device, a user input specifying at least one of the turning regions;
   then determine a plurality of routes based on the stored route and the plurality of turning regions, each route extending from the second area to the first area via one of the turning regions; and
   then, upon selecting one turning region, actuate the vehicle, in response to receiving a message from the handheld device, to operate along the route including the selected turning region and turn the vehicle around in the selected turning region.

9. The control device of claim 8, wherein the control device is further configured to actuate the vehicle to change a direction of travel between a reverse direction and a forward direction in the selected turning region.

10. The control device of claim 8, wherein the control device is further configured to select the turning region based on a distance of the route including the turning region being less than respective distances of the other routes including the other turning regions.

11. The control device of claim 8, wherein the control device is further configured to select the turning region based on a distance between the second area and the turning region.

12. The control device of claim 11, wherein the control device is further configured to select the turning region based on a size of the turning region and a size of the vehicle.

13. The control device of claim 12, wherein the control device is further configured to select the turning region additionally based on a turning radius of the vehicle.

14. The control device of claim 8, wherein the control device is further configured to select the turning region based on receiving, via the handheld device, the user input specifying the turning region.

15. A control device, configured to:
   while operating a vehicle from a first area to a second area based on a stored route, identify a plurality of turning regions along the stored route based on sensor data;
   determine a plurality of routes based on the stored route and the plurality of turning regions, each route extending from the second area to the first area via one of the turning regions;
   select one turning region based on a distance of the route including the one turning region being less than respective distances of the other routes including the other turning regions; and
   then, upon receiving a message from a handheld device, actuate the vehicle to operate along the route including the selected turning region and turn the vehicle around in the selected turning region.

* * * * *